Oct. 9, 1934.　　A. L. WARD ET AL　　1,976,704
GAS PURIFICATION
Filed July 16, 1932　　2 Sheets-Sheet 1

WITNESS:
Rob. R. Kitchel.

INVENTOR
Claude W. Jordan &
Alger L. Ward
BY
Augustus B. Stoughton
ATTORNEY.

Patented Oct. 9, 1934

1,976,704

UNITED STATES PATENT OFFICE 1,976,704

GAS PURIFICATION

Alger L. Ward, Drexel Hill, and Claude W. Jordan, Paoli, Pa., assignors to The United Gas Improvement Company, Philadelphia, Pa., a corporation of Pennsylvania Application July 16, 1932, Serial No. 622,994

31 Claims. (Cl. 23—3)

The distribution and use of manufactured and other gas is often seriously interfered with by the deposition of gummy or resinous products which in the case of a gas distribution system clog valves in meters, extinguish pilot lights and cause improper functioning of automatic valves in gas appliances.

The parent substances which form these gummy or resinous products are reactive organic compounds in the gas, among which some of the more reactive are indene, styrene, butadiene and cyclopentadiene. These and like substances by heat, oxidation, polymerization, or reaction with acids may be converted into gums and may be hereafter referred to, generally, as gum formers.

These gum formers are often present in the gas in large quantity and if a large fraction were converted into gums in the distribution system the distribution of the gas would be accompanied by great difficulties and expense. These gum formers have very appreciable calorific values and the prevention of gum formation by the removal of the gum formers would not be desirable for this reason even if a satisfactory method of removing them were developed.

Gums may form in the distribution system by the conversion of the gum formers in liquid phase in the condensate from the gas. This type of gum formation has been known for a long time and although it may be troublesome it is not so troublesome as another type of gum formation which we have discovered and investigated, namely the formation of gummy and resinous products from the gum formers in vapor phase. This latter type of gum formation is liable to persist throughout the entire length of the distribution system and the gum particles formed in suspension in the gas are to a very considerable extent carried forward to the appliances.

We have found that this type of gum formation in vapor phase is due to the presence of oxides of nitrogen in the gas. The quantity required to cause serious trouble is very small. For instance as a result of our investigations we consider it desirable to have no more than 4 to 8 grams of oxides of nitrogen present in a million cubic feet of the gas. This is cited for illustration to give an idea of the extremely low concentrations involved and we do not wish to be limited by this illustration.

The gummy or resinous products formed are very complex mixtures of substances of complicated chemical composition. Consequently it is not possible to give in detail the reactions involved in their formation. The oxides of nitrogen may be present as NO, $NO_2$ or other oxides. The oxide of nitrogen NO, present may react directly with the gum former, a reaction we have observed to take place under certain conditions in the case of indene, or the oxide of nitrogen NO, present may react with oxygen present in the gas to form $NO_2$ or other oxides of nitrogen which react with the gum former to form gums. The latter reactions we have observed to take place in the case of styrene. With the ultra microscope we have observed these reactions taking place when gas which contained no visible gum particles had added to it small quantities of oxides of nitrogen. The formation of large quantities of gum particles followed this addition.

The gum particles formed by these reactions as observed by the ultra microscope are of sizes down to the order of magnitude of 4 millionths of an inch in diameter and the smaller particles remain suspended in the gas for long periods of time. They have been observed to remain so suspended for three days.

Analyses show that one of the characteristics of these gums is a considerable nitrogen content, present as nitrogen compounds and derived from the oxides of nitrogen in the gas. A further confirmation that the nitrogen comes from this source is the acidic character of the gums and the fact that upon pyrogenic decomposition these gums yield oxides of nitrogen.

As an example of a gas containing gum formers and oxides of nitrogen, mention may be made of coal gas from coke ovens or retorts which contains cyclopentadiene and frequently contains appreciable quantities of oxides of nitrogen possibly derived from leakage through the retort walls of products of combustion of the producer gas employed for firing the ovens or retorts, or derived from the nitrogen content of the coal.

We have found that if the oxides of nitrogen are removed from such a gas, the gas still containing large quantities of gum formers may be distributed without interference due to the formation of gums from the gum formers in vapor phase. At this point it is desired to point out that the more reactive gum formers listed previously in this specification are not the only constituents of manufactured gas that react with oxides of nitrogen to form gums. We have found that all of the hydrocarbons contained in coal gas which we have thus far investigated, some thirty eight in number, as well as other carbon hydrogen containing compounds, such as phenol, will so react at greatly varying rates.

We have allowed an untreated sample of gas containing hydrocarbon gum formers and oxides of nitrogen to stand for a period at the end of which ultra microscopic examination showed the formation of large quantities of gum particles. We have treated the same gas for the removal of the oxides of nitrogen and after treatment allowed the gas to stand for the same period. Ultra microscopic examination of the treated sample showed no material formation of gum particles. We have also added oxides of nitrogen to gas containing hydrocarbon gum formers with the practically instantaneous formation of large quantities of gum particles.

We have found that oxides of nitrogen may be removed from the gas by contacting the gas with certain metal sulphides. In general the presence of an alkali is an advantage as is the presence of moisture. The most active sulphides we found to be of metals of the iron series of group VIII of the periodic table,—iron, cobalt and nickel.

In tests in which various sulphides were contacted with oxide of nitrogen NO, for five hours the following sulphides absorbed more than 2% by weight of oxide of nitrogen NO, in the absence of any alkali;—iron (ferrous) cobalt (ous), nickel (ous), tin (stannic); the compound formed by sulphiding ferric oxide. In the absence of any added alkali the following (moist) sulphides also absorbed more than 2%: barium, calcium, strontium and the compound formed by sulphiding moist sodium carbonate.

The following sulphides prepared in the presence of sodium carbonate absorbed 2% or more by weight of oxide of nitrogen NO in 5 hours contact: iron (ferrous) cobalt (ous), nickel (ous), tin (ous), copper (ous), copper (ic), manganese (ous) cadmium; and the compounds prepared by sulphiding tungstic anhydride, molybdic anhydride, modybdic acid and ferric oxide in the presence of sodium carbonate.

2% is an arbitrary decisive line and 5 hours is an arbitrary length of time, and both are used for comparison purposes only. We found that the most favorable conditions for oxide of nitrogen absorption by one sulphide are not necessarily the most favorable for another. Thus the presence of sodium carbonate $Na_2CO_3$ greatly improved the absorption by red antimonious sulphide but had the opposite effect on black antimonius sulphide.

The question of whether a sulphide must be in the lower of two possible states of oxidation in order to be a good absorber for NO is not clearly settled. The ous sulphides are the common sulphides of all three of the metals with which very high absorptions of NO were obtained. It would be difficult to prepare nickelic or cobaltic sulphides in the proper physical state to be good absorbers for NO. In the case of iron, the question of which sulphide is formed when solid ferric oxide is exposed to hydrogen sulphide has never been conclusively settled. Possibly one reason for the conflicting results which have been reported by various investigators is the influence of the conditions under which the oxide is sulphided. Thus, Gedel claimed to have proved that in the presence of any alkali, ferric oxide forms the ferric sulphide and that in a neutral or acid condition, it forms ferrous sulphide. In the present instance the question is not of importance because sulphided ferric oxide or ferric hydrate absorb large quantities of NO whether the sulphiding is done in the absence of any alkali or in the presence of calcium carbonate, sodium carbonate or sodium bicarbonate. In certain cases it may be advantageous to use hydrates of the alkalies or alkaline earths.

It may be remarked that with the exception of cadmium and the alkaline earth sulphides most of those which absorbed more than 2% of NO were sulphides of metals which are capable of existing in more than one state of oxidation. On the other hand several of the lower of two or more sulphides, for example, arsenous, are poor agents for absorbing NO.

The absorptions of oxide of nitrogen NO in percentage by weight obtained in 5 hours contact by a number of sulphides are given in the following table. These are given for comparative purposes only and we do not claim that these are the maximum absorptions which could be obtained.

| Sulphide | Absorption | |
|---|---|---|
| | Without alkali | With alkali |
| Iron | | 20.6 ($CaCO_3$). |
| Do | | 32.9 ($Na_2CO_3$). |
| Do | 10.9 | 27.1 ($NaHCO_3$). |
| Iron (ferrous) | 13.4 | 11.3 |
| Cobalt (ous) | 6.8 | 17.9 |
| Nickel (ous) | 19.2 | 6.7 |
| Manganese (ous) | 0.51 | 2.4 |
| Tungsten (sulphided tungstic anhydride) | 0.33 | 3.2 |
| Molybdenum (sulphided molybdenum sesqui oxide) | 1.7 | 1.4 |
| Molybdenum (sulphided molybdic acid) | 0.28 | 5.5 |
| Arsenic (ous) | Nil. | 0.05 |
| Arsenic (di) | 0.13 | 0.16 |
| Antimony (ous, red) | 0.25 | 3.6 |
| Antimony (ous, black) | 0.12 | 0.02 |
| Antimony (penta) | 0.23 | 0.93 |
| Bismuth | 0.77 | 1.6 |
| Tin (ous, hydrosulphide) | 1.0 | 1.5 |
| Tin (ous) | 0.52 | 2.0 |
| Tin (ic) | 2.4 | 1.9 |
| Lead | 0.34 | 0.87 |
| Aluminum | Nil. | |
| Magnesium | 0.53 | |
| Strontium | 4.3 | |
| Barium | 5.6 | 2.6 ($Na_2CO_3$) |
| Calcium | 3.2 | |
| Mercury (ic) (black) | 0.09 | 1.7 |
| Mercury (ic) (red) | 0.15 | 1.5 |
| Cadmium | 0.53 | 3.3 |
| Zinc | 0.39 | 1.7 |
| Silver | 0.38 | 1.5 |
| Copper (ous) | 0.51 | 2.5 |
| Copper (ic) | 0.48 | 3.3 |
| Sodium (di, sulphided $Na_2CO_3$) | 0.49 | |
| Sodium (hydro sulphided moist $Na_2CO_3$) | 2.2 | |

As examples of the effect of the presence of alkali and moisture on the absorption by the iron group the following is given:

| Sulphide | Carbonate added | Preparation of material | NO absorbed in 5 hours in per cent by weight of original (dry) substances |
|---|---|---|---|
| Iron sulphide | None | Fe $(OH)_3 \times H_2O$, dried at 105° C. + $H_2S$. | 10.9 |
| Do | $Na_2CO_3$ | Fe $(OH)_3 \times H_2O$ mixed with 20.7% $Na_2CO_3$ dried at 105° C. + $H_2S$. | 14.2 |
| Do | $CaCO_3$ | Same with 17.8% $CaCO_3$ instead of 20.7% $Na_2CO_3$. | 20.6 |
| Do | None | Fe $(OH)_3 \times H_2O$ dried and 30% $H_2O$ added + $H_2S$. | 7.9 |
| Do | $Na_2CO_3$ | Fe $(OH)_3 \times H_2O$ mixed with 20.7% $Na_2CO_3$ dried and 30% $H_2O$ added + $H_2S$. | 32.9 |

| Sulphide | Carbonate added | Preparation of material | NO absorbed in 5 hours in percent by weight of original (dry) substances |
|---|---|---|---|
| Iron sulphide | $CaCO_3$ | Same with 17.8% $CaCO_3$ instead of 20.8% $Na_2CO_3$. | 8.8 |
| Do | $\{Na_2CO_3, CaCO_3\}$ | "Lux" iron oxide dried at 105° C.+$H_2S$. | 18.4 |
| Do | $\{Na_2CO_3, CaCO_3\}$ | "Lux" iron oxide air dried +$H_2S$. | 23.3 |
| Do | $\{Na_2CO_3, CaCO_3\}$ | "Lux" iron oxide dried at 105° C. plus 30% $H_2O$+$H_2S$. | 27.4 |
| Cobaltous sulphide | None | $CoCO_3$+$H_2S$ | 6.8 |
| Do | $Na_2CO_3$ | $CoCO_3$+50%; $Na_2CO_3$ wet paste air dried + $H_2S$. | 17.9 |
| Do | $Na_2CO_3$ | Same moistened | 9.2 |
| Do | $Na_2CO_3$ | Same wet | 3.0 |
| Cobaltic sulphide | | Cobaltous sulphide is the stable form | |
| Nickelous sulphide | None | $NiCO_3$+$H_2S$ | 19.2 |
| Do | $Na_2CO_3$ | $NiCO_3$+50%; $Na_2CO_3$ wet paste air dried + $H_2S$. | 6.7 |
| Nickelic sulphide | | Nickelous sulphide is the stable form | |

We are aware of the fact that in ordinary purification of gas from hydrogen sulphide, hydrated iron oxide is employed, which combines with the hydrogen sulphide to form iron sulphide and that the gas comes in contact with the iron sulphide so formed.

No one has been aware of the fact, however, that iron sulphide removed oxides of nitrogen from the gas or that the presence of small quantities of oxides of nitrogen caused serious troubles in the distribution system due to vapor phase gum formation. Nor has any one actually used iron sulphide to perform the function of removing oxides of nitrogen for that purpose.

As a result, such contact as has occurred between the gas and iron sulphide has been an accidental and sporadic outcome of the hydrogen sulphide purification and was not understood, or accepted, to prevent gum formation in the vapor phase. The iron oxide purifying material has been handled from the viewpoint of hydrogen sulphide purification only, and the requirements of efficient hydrogen sulphide purification necessitates the revivification or the discarding of the material long before it is completely converted to iron sulphide. There has thus been no attempt to secure and maintain sufficient contact between the gas and iron sulphide to reduce and maintain the content of oxides of nitrogen in the purified gas below the point at which trouble from gum formation will occur. We have repeatedly observed large quantities, (relative to the safe concentration) of oxides of nitrogen in the gas after passing through the regular purification systems, both the iron oxide box systems and liquid purification systems. For instance we have observed contents of 80 grams per million cubic feet in the gas issuing from an iron oxide box system and 188 grams per million cubic feet in the gas issuing from the catch boxes of a liquid purification system.

Furthermore on reuse of the iron oxide material after ordinary revivification methods, oxides of nitrogen are given up to the gas, so that while one part of the purification system may be removing some of the oxides of nitrogen content of the gas succeeding portions may be returning previously removed oxides of nitrogen to the gas.

Although iron sulphide is exceedingly avid in combining with the oxides of nitrogen, it is necessary to reduce the concentration to such an extremely low figure for proper control of gum formation, that considerable contact between the gas and the iron sulphide is required. Present purification practice by no means secures this consistently although at times due to accidently favorable conditions a removal of 90% of the oxides of nitrogen may be attained. The remaining 10% however is very frequently sufficient to cause serious trouble. There are times in ordinary purification practice when conditions are very unfavorable for the removal of oxides of nitrogen from the gas. For instance just after a foul box has been cut out and a box of revivified material cut in to the system, the iron sulphide content of the system is very low, a condition which maintains for some time and a relatively large quantity of oxides of nitrogen may be added to the gas from the revivified material, in such a case it is even possible to have a higher oxides of nitrogen content in the gas issuing from the system than is in the gas entering the system.

In accordance with our invention we contact the gas with iron sulphide which is not put through the usual routine of revivification. Preferably it is not revivified at all but is employed as long as it will efficiently remove oxides of nitrogen and then is removed. The iron sulphide employed may be ordinary fouled hydrated iron oxide purification material or iron sulphide may be specially prepared. For instance iron oxide purifying material may be placed on shavings and converted to iron sulphide outside of the purification system by passing through the mass pure hydrogen sulphide or hydrogen sulphide free of oxides of nitrogen. Or iron sulphide may be prepared by conversion of iron oxide with hydrogen sulphide and then placed on shavings. Preferably we employ much less iron per unit of volume of contact mass than is customary in hydrogen sulphide purification. In the latter case the shavings are usually loaded with about 3.5 pounds per bushel or more. Whereas in our oxide of nitrogen removal we prefer to coat the shavings lightly with from say 0.3 to 0.7 pounds of iron per bushel.

The use of such specially prepared iron sulphide has the advantage of providing material which has had no previous contact with oxides of nitrogen and therefore has a higher capacity for reaction with them than iron sulphide prepared by fouling iron oxide with gas containing oxides of nitrogen.

The hydrogen sulphide employed for the preparation of the iron sulphide may be generated in any suitable manner.

The use of a metal sulphide such as iron sulphide for the removal of oxides of nitrogen is particularly advantageous as it reacts with them avidly and does not remove the gum formers contained in manufactured gas to any appreciable extent, thereby preventing vapor phase gum formation without reducing the calorific power of the gas.

As an example of the activity of iron sulphide in the removal of oxides of nitrogen the following is cited. Gas at the rate of 1 cubic foot per hour containing no hydrogen sulphide $H_2S$ and 0.6 to 0.5% oxygen was passed through 30 grams of "Lux" iron oxide which had been completely fouled with $H_2S$.

Below is shown the content of oxides of nitrogen in the gas at the inlet and outlet after passage of certain quantities of gas.

| Gas passed cu. ft. | Grams per million cu. ft. | | | |
|---|---|---|---|---|
| | NO inlet | NO₂ inlet | NO outlet | NO₂ outlet |
| 1 | 35.0 | | 0 | |
| 15 | 52.5 | | 0 | |
| 17 | 50.0 | | 0 | |
| 32 | 37.5 | | 0.10 | |
| 35 | 25.0 | 3.5 | 0.40 | 0 |
| 41 | 16.0 | 20.5 | 0.20 | 0.1 |

The fact that oxides of nitrogen were beginning to pass the sulphide mass toward the end of the experiment was not due to saturation with oxides of nitrogen but to the fact that no hydrogen sulphide was present to neutralize the revivifying effect of the oxygen in the gas.

The "Lux" iron oxide is a by-product iron oxide which contains alkalis. After fouling with H₂S its activity in the removal of oxides of nitrogen is greater than that of pure iron sulphide. A certain amount of moisture is also desirable.

The invention is further described in connection with the attached figures which form a part of this specification and which show somewhat diagrammatically apparatus for carrying out the invention, and in which—

Figure 1:
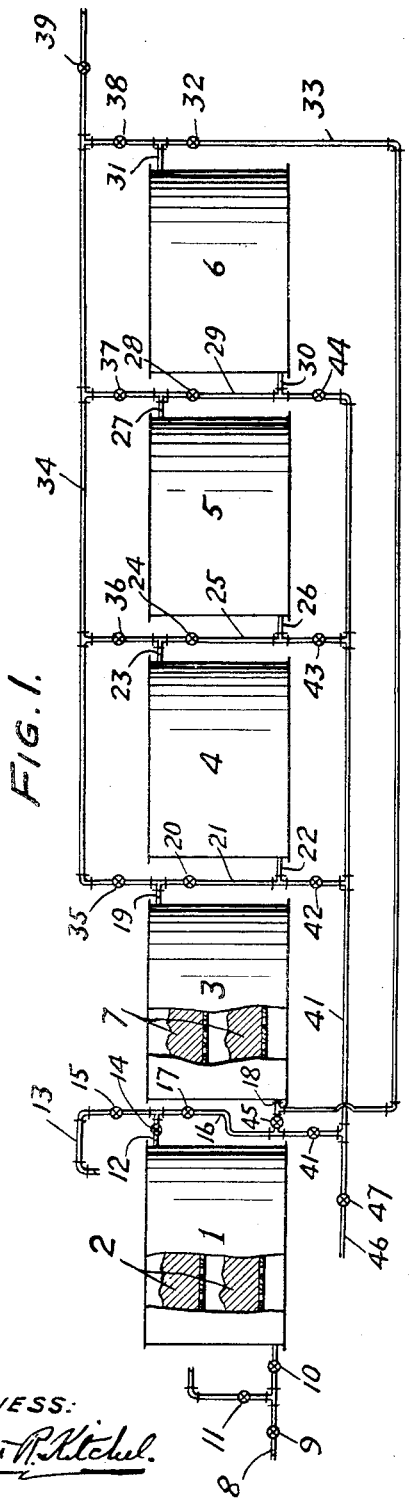
Fig. 1 shows apparatus for the removal of oxides of nitrogen prior to removal of hydrogen sulphide H₂S by iron oxide.

Referring to Fig. 1:

1 indicates one of a pair of boxes containing iron sulphide as indicated at 2 and arranged in the gas flow at the inlet to the hydrogen sulphide, H₂S purification system, comprising the boxes 3, 4, 5, 6. The other box containing iron sulphide is not shown but is arranged in parallel with box 1 so that one box may be used while the other is being emptied or refilled.

The gas to be purified flows through inlet connection 8 controlled by valve 9, and through valve 10 to the gas inlet of box 1 or through valve 11 to the gas inlet of the box (not shown) in parallel to box 1. The gas flows upward through the iron sulphide 2. The oxides of nitrogen being removed by reaction with the iron sulphide, the gas with the oxides of nitrogen removed or reduced to the desired extent flows out of the gas outlet 12 controlled by valve 14 or out of the gas outlet 13 leading from the parallel box, (not shown) controlled by valve 15 depending on whether box 1 or the parallel box is in use. The gas flows thence through valve 17 in connection 16 to the hydrogen sulphide H₂S purification system, which is indicated as a typical system comprising the four boxes 3, 4, 5, 6 arranged so that the gas may flow through them in the series—3, 4, 5, 6; 4, 5, 6, 3; 5, 6, 3, 4; 6, 3, 4, 5 or for instance with one box being revivified or emptied and refilled through the series—4, 5, 6; 5, 6, 3; 6, 3, 4; 3, 4, 5.

18 is the gas inlet connection to box 3; 19 the gas outlet connection leading through valve 20 and connection 21 to the gas inlet connection 22 of box 4. 23 is the gas outlet connection of box 4 leading through valve 24 and connection 25 to the gas inlet connection 26 of box 5. 27 is the gas outlet of box 5 leading through valve 28 and connection 29 to the gas inlet 30 of box 6. 31 is the gas outlet of box 6 leading through valve 32 and return connection 33 to the gas inlet 18 of box 3.

The gas outlets 19 of box 3, 23 of box 4, 27 of box 5, and 31 of box 6 are connected to the gas offtake 34 through valves 35, 36, 37, 38 respectively. Valve 39 controls the gas offtake. The connection 16 leading from the iron sulphide boxes besides being connected to the inlet 18 of box 3 are connected through valve 40 and the inlet header 41 to the inlets 22 of box 4, 26 of box 5, and 30 of box 6 through valves 42, 43, 44 respectively. Valve 45 controls the flow from connection 16 to inlet 18 of box 3.

46 is an air supply means controlled by valve 47 and leading to the inlet header 40 for supplying air for continuous revivification of the iron oxide purifying material.

Assuming the hydrogen sulphide H₂S box series at a given time to be 5, 6, 3 with box 4 out for revivification or refilling, that box 1 is in use with the parallel box out for refilling, and with valves 9, 10, 14, 17, 41, 43, 28, 32, 35, 39 open, and valves 11, 15, 45, 20, 42, 36, 24, 37, 38 closed, the gas flows through the gas inlet 10 and through box 1 and from thence through connections 16 and 40 to the inlet 26 of box 5 through box 5 to the outlet 22 and connection 29 to the inlet connection 30 of box 6, through box 6 to the outlet 31 and thence through the return connection 33 to the inlet 18 of box 3, through box 3 to the outlet 19 and thence through the gas offtake 34 to storage or other disposal. A limited amount of air may be admitted to the gas from air supply 46 controlled by valve 47 after the gas has passed through box 1 for continuous revivification of the iron oxide purifying material in the H₂S boxes.

After box 5 which is the foulest box in the assumed series 5, 6, 3 is no longer taking out 60% of the H₂S it is cut out of the series and box 4 replaced in the series filled with revivified material and the series becomes 6, 3, 4 with box 5 being revivified or emptied and refilled.

The iron sulphide boxes 1 and its parallel box provide sufficient contact between the gas and iron sulphide to remove the oxides of nitrogen prior to the passage of the gas to the H₂S boxes so that these latter boxes may be manipulated for the best hydrogen sulphide H₂S removal efficiency without decreasing the iron sulphide content of the system too low, also as the oxides of nitrogen are removed prior to contact with the material in the hydrogen sulphide H₂S boxes, this material can absorb little or no oxides of nitrogen and therefore may be continuously revivified or re-used after revivification in place or out of the boxes without returning oxides of nitrogen to the gas on re-use.

The iron sulphide material in box 1 and its parallel box does not enter into the routine revivification undergone by the iron oxide material in the H₂S boxes. We prefer not to re-use it after it has been fouled sufficiently with oxides of nitrogen to warrant its removal. We have found that, when iron sulphide is prepared from iron oxide purifying material by conversion with hydrogen sulphide H₂S and then is fouled with oxides of nitrogen until it will take up no more, the ordinary methods of revivification do not return the material to proper condition for re-use in the removal of either hydrogen sulphide H₂S or oxides of nitrogen. For instance, Lux Oxide was fouled with hydrogen sulphide H₂S until it had taken up 23.2% of hydrogen sulphide H₂S and afterwards fouled with pure oxide of nitrogen NO until it had taken up 23.2% oxide of nitrogen NO. It was then exposed to air (moistened) for a week and thereafter would only take up 7% hydrogen sulphide H₂S and 4% oxide of nitrogen NO.

Figure 2:
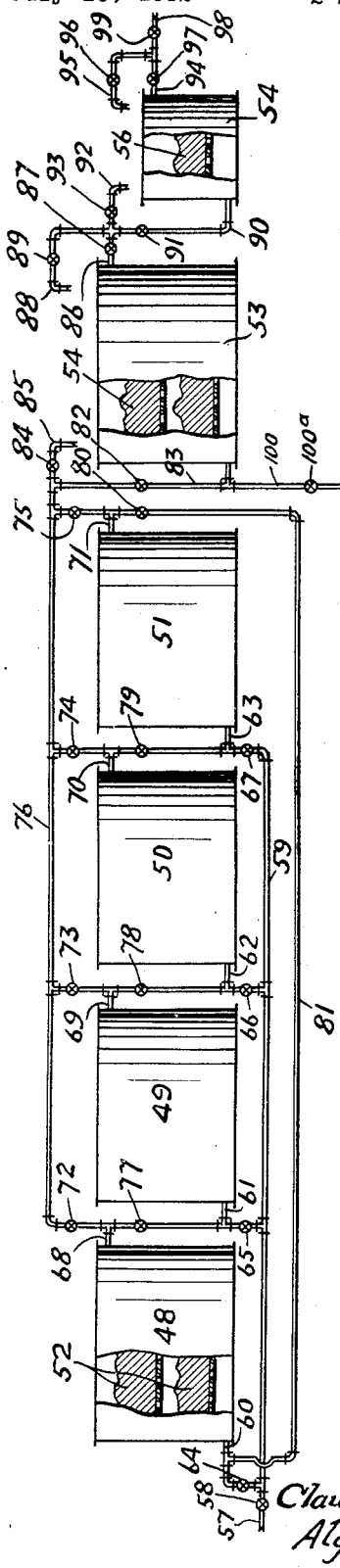
Fig. 2 shows apparatus for the removal of oxides of nitrogen after the removal of hydrogen sulphide H₂S by iron oxide.

Referring to Figure 2:

This figure shows apparatus for the removal of oxides of nitrogen after the gas has passed through the hydrogen sulphide H₂S purification boxes.

48, 49, 50, 51 indicates the hydrogen sulphide H₂S purification boxes provided with iron oxide purifying material as indicated at 52. 53 is one of a pair of boxes provided with iron sulphide indicated at 54. 55 is one of a pair of catch boxes provided with iron oxide as indicated at 56.

The hydrogen sulphide H₂S purification boxes and connections are typical of present oxide purification systems. The boxes and connections are arranged so that the gas may be passed through the boxes in the series, 48, 49, 50, 51; 49, 50, 51, 48; 50, 51, 48, 49; 51, 48, 49, 50, or with one box cut out for revivification or emptying and refilling through series 48, 49, 50; 49, 50, 51; 50, 51, 48; 51, 48, 49.

The gas to be purified enters through the gas inlet 57 controlled by valve 58, to the gas inlet header 59 which is connected to the gas inlets 60 of box 48, 61 of box 49, 62 of box 50, 63 of box 51 through valves 64, 65, 66, 67 respectively. The gas outlets 68 of box 48, 69 of box 49, 70 of box 50, 71 of box 51 are connected through valves 72, 73, 74, 75 with the gas offtake 76 leading from the hydrogen sulphide H₂S purification boxes. Gas outlet connection 68 of box 48 is connected with the gas inlet connection 61 of box 49 through valve 77, similarly gas outlet 69 is connected through valve 78 with gas inlet 62, gas outlet 70 through valve 79 with gas inlet 63, and gas outlet 71 through valve 80 and the return connection 81 with gas inlet 60.

The gas offtake header 76 leads through valve 82 and inlet 83 to box 53 containing iron sulphide and through valve 82 and the connection 81 to the box containing iron sulphide in parallel with box 53 (not shown). Gas outlet connection 86 leads from box 53 through valve 87, gas outlet 88 leads through valve 89 from the parallel box. Both these outlets lead to a pair of catch boxes in parallel, one of which is shown at 54. The outlets are connected to the inlet 90 of catch box 54 through valve 91 and through connection 92 and valve 93 with the parallel catch box.

The outlets 94 and 95 of the catch boxes lead through valves 96 and 97 to the gas offtake 98 controlled by valve 99.

Connection 100 provided with valve 100ª provides means for introducing hydrogen sulphide or a hydrogen sulphide containing gas to counteract the revivifying effect of any oxygen which may be in the gas. A small quantity of the gas prior to the hydrogen sulphide purification may be bled around the oxide boxes and introduced through connection 100.

Figure 3:
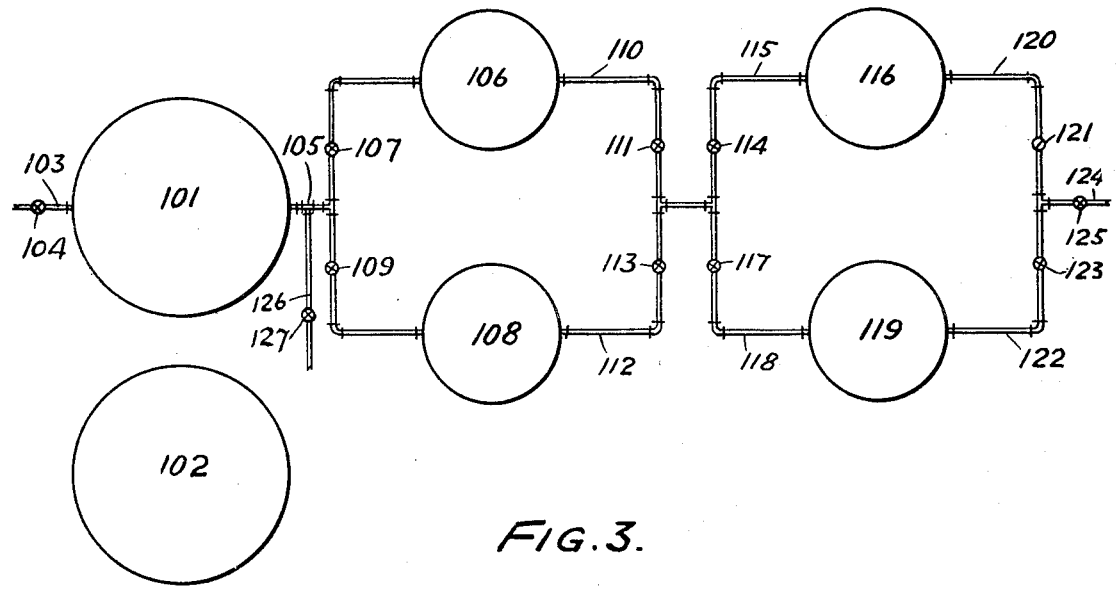
Fig. 3 shows apparatus for the removal of oxides of nitrogen after the removal of hydrogen sulphide H₂S by liquid purification.

Referring to Fig. 3:

This figure shows an application of the invention in combination with the liquid purification of town gas from hydrogen sulphide H₂S.

The gas enters through inlet line 103 controlled by valve 104 and passes through the absorption tower 101 of the liquid purification system where the gas is scrubbed with alkaline solution which may contain a suspension of iron oxide or solution of iron or other salts for the removal of hydrogen sulphide H₂S. 102 is the tower for the revivification of the purifying solution. The gas containing only residual hydrogen sulphide H₂S passes through the outlet connection 105 to either one of the boxes 106 or 108 containing iron sulphide, which may be specially prepared iron sulphide placed on shavings or may be iron oxide purifying material fouled with hydrogen sulphide H₂S. The flow through 106 or 108 is controlled by appropriate manipulation of the valves 107 and 109 in the inlet lines to the boxes and the valves 111 and 113 in the outlet lines 110 and 112 respectively. The oxides of nitrogen content of the gas is removed by contact with the iron sulphide, after passage through the iron sulphide, the gas passes to one or the other of the catch boxes 116 and 119 which contain iron oxide purifying material, for the removal of any residual hydrogen sulphide H₂S. The passage through box 116 or 119 is controlled by appropriate manipulation of the valves 114 and 117 in inlet lines 115 and 118 respectively and valves 121 and 123 in the outlet lines 120 and 122 respectively. 124 is the gas offtake from the purification system controlled by valve 125.

One or the other of the boxes 106 and 108 may be in use while the other is being emptied and refilled with iron sulphide.

Connection 126 provided with valve 127 may be employed to introduce hydrogen sulphide or a hydrogen sulphide containing gas to counteract the revivifying effect of any oxygen that may be in the gas. A small quantity of the gas prior to the hydrogen sulphide purification may be bled off and bypassed around the hydrogen sulphide absorber and introduced through connection 126.

Figure 4:
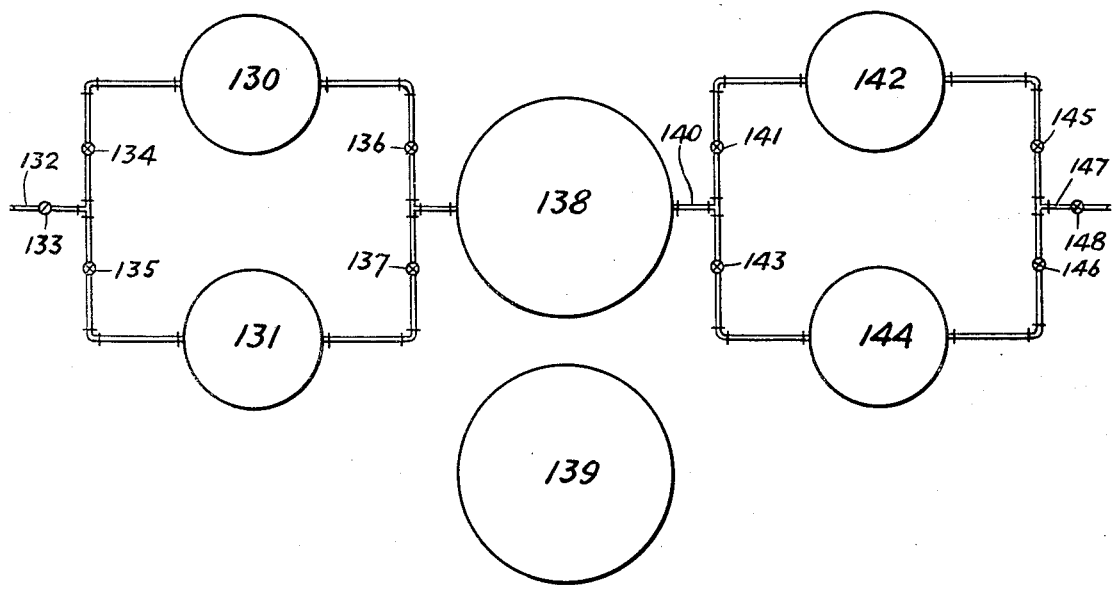
Fig. 4 shows apparatus for the removal of oxides of nitrogen prior to the removal of hydrogen sulphide H₂S by liquid purification.

Referring to Fig. 4:

In this modification the iron sulphide boxes are placed on the inlet side of the liquid purification apparatus instead of between the absorption tower and the catch boxes as in Figure 3.

The gas to be purified passes through the line 132 controlled by valve 133 and flows through one or the other of the boxes 130 and 131 which are provided with iron sulphide, the flow being controlled by appropriate setting of the valves 134 and 135 and the valves 136 and 137. The oxides of nitrogen are removed by contact with the iron sulphide and the gas then flows through the absorption tower 138 where the hydrogen sulphide H₂S content is removed. From the absorption tower the gas flows through connection 140 and through one or the other of the iron oxide catch boxes 142 and 144 depending on the setting of valves 140 and 141 in the inlet lines and 145 and 146 on the outlet lines, the gas then passes through the gas offtake connection 147, controlled by valve 148. 139 is the revivification tower of the liquid purification system.

The invention has been described in connection with the prevention of gum formation in manufactured distributed gas and has been described in connection with iron oxide and liquid purification for hydrogen sulphide H₂S. It is adapted to use with other purification systems and in connection with the purification of other gases. For instance it may be employed in the removal of oxides of nitrogen from hydrogen destined for use in chemical processes, or from nitrogen destined for use in the manufacture of ammonia or from other gases.

In the apparatus shown for illustration, a box for the sulphide, similar to present iron oxide purification boxes has been shown.

It might be desirable under certain conditions to provide a descending column of the sulphide material through which the gas is passed or to pass the gas through a shower of finely divided sulphide. The box system however seems preferable, as the quantity of oxides of nitrogen in the gas is small and the material may be allowed to remain in a large box for a relatively long time without removal.

The invention has been described in detail in connection with the use of iron sulphide, but it is not desired that this shall limit its scope. Iron sulphide is the cheapest sulphide to use, but other sulphides particularly nickel and cobalt will serve efficiently as before indicated.

It will be obvious from the previous tables giving comparative data on the absorption of nitric oxide by various sulphides, that if the removal of substantially all of the nitric oxide from gas is desired, as in such removal from manufactured gas for the prevention of vapor phase gum formation, sulphides giving the higher absorption in the tables should be employed, the iron, cobalt, nickel group being by far the best for this purpose. In other cases of nitric oxides the other sulphides are available.

We have found that the presence of a large percentage of alkali in the sulphide increases the stability of the compound or compounds formed by reaction with the oxides of nitrogen. From the standpoint of stability of the products of the reaction an alkaline content of 30% to 70% is desirable and it is preferable that the alkaline content should be present as both carbonate and bicarbonate. For instance iron sulphide prepared from a mixture composed of iron hydrate Fe(OH)$_3$ or ferric oxide Fe$_2$O$_3$ and 30% to 70% of sodium carbonate and sodium bicarbonate in equal proportions and moistened with 50% water and converted with hydrogen sulphide H$_2$S, produces relatively stable products on reaction with oxides of nitrogen. This mixture may be formed by adding additional alkali to "Lux" iron oxide, or other by-product oxide already containing some alkali. Mixtures of lower alkalinity are relatively much less stable whereas mixtures of higher alkalinity have relatively small capacity.

The following results of experiments show the relative stability of the products of reaction when employing mixtures in the range from 30% to 5% alkalinity. The NO was absorbed to approximate saturation and the quantity of NO released to first cubic foot of gas after purging was determined.

| Percent Fe$_2$O$_3$ | Percent Na$_2$CO$_3$ | NO absorbed percent by weight of dry mixture | NO released grams per million cubic feet |
|---|---|---|---|
| 70 | 30 | 22.8 | 1800 |
| 80 | 20 | 44.5 | 3300 |
| 90 | 10 | 28.6 | 4000 |
| 95 | 5 | 28.4 | 19000 |

In practice the sulphide would be removed before saturation and the above figures are quoted merely to show the effect of alkalis on the stability of the product.

This iron sulphide, particularly of the above high alkalinity, is very reactive to oxygen. Oxygen is normally present in manufactured town gas, although this oxygen may be in low concentration, say 0.5%. For this reason when this material is employed it is especially desirable to insure the presence of some hydrogen sulphide H$_2$S to neutralize the revivifying effect of oxygen when present. This may be done by arranging the high alkaline material at an intermediate point in the flow of the gas through the hydrogen sulphide H$_2$S purification train at which the hydrogen sulphide H$_2$S content of the gas is from say 10 to 60 grains. If oxides of nitrogen are being removed by iron sulphide of high alkalinity from gas containing little or no hydrogen sulphide H$_2$S, it may be desirable to add a small quantity of hydrogen sulphide H$_2$S to neutralize the effect of the oxygen. This may be done by adding gas containing hydrogen sulphide H$_2$S or by generating hydrogen sulphide H$_2$S and adding it to the gas.

The invention provides a method for the prevention or reduction of vapor phase gum formation in gases and methods for the removal of oxides of nitrogen from gas. In certain of the applications it has other advantages, for instance when the oxides of nitrogen are removed prior to the purification of gas from hydrogen sulphide H$_2$S by iron oxide, we believe that the life of the iron oxide will be prolonged due to a decrease in caking in the boxes and due to increased efficiency in revivification.

In the following claims the term nitrogen oxide is intended to cover one or more oxides of nitrogen.

In the preparation of the contact mass described above, the alkali was added to the mixture prior to conversion with H$_2$S. In this conversion a portion of the alkali will be converted to a sulphide or bi-sulphide, the quantity so converted depending on conditions. Alkali in the claims is intended to cover both the converted and unconverted alkali, which may initially be present as carbonate, bi-carbonate or hydrate or other alkaline compounds.

We claim:

1. A method of opposing gum formation in the vapor phase in the distribution of combustible gas containing organic gum formers and which prior to purification contains nitrogen oxide of which at least some is in the form of nitric oxide, which comprises purifying said gas by continuously and systematically removing substantially all of the nitrogen oxide from the gas prior to its entering the distribution system, and admitting the gas substantially free from nitrogen oxide into the distribution system.

2. A method of opposing gum formation in the vapor phase in the distribution of combustible gas containing organic gum formers and which prior to purification contains nitrogen oxide, of which at least some is in the form of nitric oxide which comprises purifying said gas by contacting the gas with a porous metallic mass in sulphide condition and maintaining said mass in sufficiently sulphided condition to remove substantially all of the nitrogen oxide by the action of said sulphide, and admitting the gas substantially free from nitrogen oxide into the distribution system.

3. A method of opposing gum formation in the vapor phase in the distribution of combustible gas which prior to purification contains nitrogen oxide, of which at least some is in the form of nitric oxide, and containing valuable reactive organic compounds, which in the presence of nitrogen oxide form gum in the vapor phase, which comprises purifying said gas by continuously and systematically removing substantially all of the nitrogen oxide from the gas leaving the valuable compounds in the gas by contacting the gas with a porous metallic mass in sulphide condition and maintaining in said mass a sufficient sulphide content to remove substantially all of the nitrogen oxide by the action of said sulphide, prior to the entry of the gas into the distribution system, and admitting the gas substantially free from nitrogen oxide into the distribution system.

4. In gas purification a method of opposing gum formation in the vapor phase in gas containing nitrogen oxide of which at least some is in the form of nitric oxide and containing reactive organic compounds which in the presence of nitrogen oxide form gum in the vapor phase which comprises contacting the gas with a porous, moist, alkaline, metallic mass in sulphide condition and maintaining in said mass a sufficient sulphide content to remove substantially all of the nitrogen oxide by the action of said sulphide.

5. In gas purification a method of opposing gum formation in the vapor phase in gas containing nitrogen oxide of which at least some is in the form of nitric oxide and containing reactive organic compounds which in the presence of nitrogen oxide form gum in the vapor phase which comprises contacting the gas with a porous, metallic mass in sulphide condition and containing an alkaline earth compound and maintaining in said mass a sufficient sulphide content to remove substantially all of the nitrogen oxide by the action of said sulphide.

6. A method of opposing gum formation in the vapor phase in the distribution of gas which prior to purification contains nitrogen oxide of which at least some is in the form of nitric oxide and containing reactive organic compounds which in the presence of nitrogen oxide form gum in the vapor phase which comprises purifying said gas by contacting the gas with a porous mass containing a sulphide of the iron series of group VIII of the periodic table,—and maintaining in said mass a sufficient sulphide content to remove substantially all of the nitrogen oxide by the action of said sulphide, and admitting the gas substantially free from nitrogen oxide into the distribution system.

7. In gas purification a method of opposing gum formation in the vapor phase in gas containing nitrogen oxide of which at least some is in the form of nitric oxide and containing reactive organic compounds which in the presence of nitrogen oxide form gum in the vapor phase which comprises contacting the gas with a porous metallic mass in sulphide condition and containing alkali in the form of a carbonate and a bicarbonate and maintaining in said mass a sufficient sulphide content to remove substantially all of the nitrogen oxide by the action of said sulphide.

8. A method of opposing gum formation in the vapor phase in gas which prior to purification contains nitrogen oxide of which at least some is in the form of nitric oxide and containing reactive organic compounds which in the presence of nitrogen oxide form gum in the vapor phase which comprises purifying said gas by contacting the gas in the presence of hydrogen sulphide with a moist porous metallic mass in sulphide condition and maintaining in said mass a sufficient sulphide content to remove substantially all of the nitrogen oxide by the action of said sulphide, and admitting the gas substantially free from nitrogen oxide into the distribution system.

9. In the purification of gas containing hydrogen sulphide, nitrogen oxide at least some of which is in the form of nitric oxide and containing hydrocarbon gum formers, the method which comprises contacting the gas with a porous metallic mass in sulphide condition and maintaining in said mass a sufficient sulphide content to remove substantially all of the nitrogen oxide by the action of said sulphide without substantial removal of the hydrocarbon gum formers and subsequently removing the hydrogen sulphide by contacting the gas with iron oxide purifying material.

10. In the purification of gas containing hydrogen sulphide, oxides of nitrogen of which at least some is in the form of nitric oxide and containing hydrocarbon gum formers, the method which comprises contacting the gas with a porous metallic mass in sulphide condition and maintaining in said mass a sufficient sulphide content to remove substantially all of the nitrogen oxide by the action of said sulphide, without substantial removal of the hydrocarbon gum formers, subsequently removing the hydrogen sulphide content of the gas by contacting the gas with iron oxide purifying material and continuously revivifying the iron oxide purifying material by the admission of air to the gas after it has been contacted by said metallic mass in sulphide condition.

11. In the purification of gas containing nitrogen oxide of which at least some is in the form of nitric oxide and containing hydrogen sulphide and hydrocarbon gum formers, the method comprising contacting the gas with a porous metallic mass in sulphide condition, and maintaining in said mass a sufficient sulphide content to remove substantially all of the nitrogen oxide by the action of said sulphide and thereafter removing any residual hydrogen sulphide.

12. In the purification of gas containing oxygen, nitrogen oxide, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the metal sulphide employed in the next step, thereafter contacting the gas with a porous metallic mass in sulphide condition, and adapted to remove nitrogen oxide without substantial removal of the hydrocarbon gum formers, maintaining in said mass by the action of the residual hydrogen sulphide a sufficient metallic sulphide content to remove substantially all of the nitrogen oxide by the action of said metallic sulphide.

13. In the purification of gas containing oxygen, nitrogen oxide, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the metal sulphide employed in the next step, thereafter contacting the gas with a porous alkaline metallic mass in sulphide condition and adapted to remove nitrogen oxide without substantial removal of the hydrocarbon gum formers, maintaining in said mass by the action of the residual hydrogen sulphide a sufficient metallic sulphide content to remove substantially all of the nitrogen oxide by the action of said metallic sulphide.

14. In the purification of gas containing oxygen, nitrogen oxide, hydrogen sulphide, and hydrocarbon gum formers, the method comprising, removing part of the hydrogen sulphide by contacting the gas with purifying reagents adapted to remove hydrogen sulphide but leaving in the gas sufficient residual hydrogen sulphide to counteract the effect of a reaction between oxygen in the gas and the metal sulphide employed in the next step, thereafter contacting the gas with a porous moist alkaline metallic mass in sulphide condition, and adapted to remove nitrogen oxide without substantial removal of the hydrocarbon gum formers, maintaining in said mass by the action of the residual hydrogen sulphide a sufficient metallic sulphide content to remove substantially all of the nitrogen oxide by the action of said metallic sulphide.

15. In the purification of gas containing oxygen, nitrogen oxide, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the metal sulphide employed in the next step, thereafter contacting the gas with a porous metallic mass containing a sulphide or sulphides of one or more of the metals of group VIII, and adapted to remove nitrogen oxide without substantial removal of the hydrocarbon gum formers, maintaining in said mass by the action of the residual hydrogen sulphide a sufficient iron sulphide content to remove substantially all of the nitrogen oxide by the action of said metallic sulphide.

16. In the purification of gas containing oxygen, oxides of nitrogen, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the metal sulphide employed in the next step, thereafter contacting the gas with a porous alkaline metallic mass containing a sulphide or sulphides of one or more of the metals of group VIII, and adapted to remove nitrogen oxide without substantial removal of the hydrocarbon gum formers, maintaining in said mass by the action of the residual hydrogen sulphide a sufficient iron sulphide content to remove substantially all of the nitrogen oxide by the action of said metallic sulphide.

17. In the purification of gas containing oxygen, oxides of nitrogen, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the metal sulphide employed in the next step, thereafter contacting the gas with a porous, moist, alkaline, metallic mass containing a sulphide or sulphides of one or more of the metals of group VIII, and adapted to remove nitrogen oxides without substantial removal of the hydrocarbon gum formers, maintaining in said mass by the action of the residual hydrogen sulphide a sufficient metallic sulphide content to remove substantially all of the nitrogen oxide by the action of said metallic sulphide.

18. In the purification of gas containing oxygen, nitrogen oxide, hydrogen sulphide, and hydrocarbon gum formers, the method comprising removing part of the hydrogen sulphide by contacting the gas with purifying reagents adapted to remove hydrogen sulphide, but leaving in the gas sufficient residual hydrogen sulphide to counteract the effect of a reaction between oxygen in the gas and metal sulphide employed in the next step, thereafter contacting the gas with a porous metallic mass containing one or more sulphides of iron and adapted for the removal of nitrogen oxide without the substantial removal of hydrocarbon gum formers maintaining on said mass by the action of the residual hydrogen sulphide a sufficient iron sulphide content to remove substantially all of the nitrogen oxide by the action of said iron sulphide.

19. In the purification of gas containing oxygen, nitrogen oxide, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the iron sulphide employed in the next step, thereafter contacting the gas with a porous contact mass formed by sulphiding iron oxide or hydroxide and sodium carbonate and adapted to remove nitrogen oxide without substantial removal of the hydrocarbon gum formers, maintaining in said mass by the action of the residual hydrogen sulphide a sufficient iron sulphide content to remove substantially all of the nitrogen oxide by the action of said iron sulphide.

20. In the purification of gas containing oxygen, nitrogen oxide, hydrogen sulphide, and hydrocarbon gum formers, the method comprising removing part of the hydrogen sulphide by contacting the gas with purifying reagents adapted to remove hydrogen sulphide but leaving in the gas sufficient residual hydrogen sulphide to counteract the effect of a reaction between oxygen in the gas and the iron sulphide employed in the next step, thereafter contacting the gas with a porous contact mass formed by sulphiding "Lux" iron oxide, and adapted to remove nitrogen oxide without substantial removal of the hydrocarbon gum formers, maintaining in said mass by the action of the residual hydrogen sulphide a sufficient iron sulphide content to remove substantially all of the nitrogen oxide by the action of said iron sulphide.

21. In the purification of gas containing nitrogen oxide, the method of removing nitrogen oxide comprising contacting the gas with a moist, porous, contact mass comprising a mixture of an iron sulphide and from 30% to 70% alkali, thereby forming relatively stable reaction products from the reaction between the contact material and the nitrogen oxide.

22. In the purification of gas containing oxygen and nitrogen oxide from nitrogen oxide by contacting the gas with a moist porous mass comprising a mixture of a metallic sulphide and from 30% to 70% alkali the step of supplying sufficient hydrogen sulphide to counteract the effect of a reaction between the oxygen and the metallic sulphide and to maintain sufficient metallic sulphide to remove substantially all of the nitrogen oxide by the action of said metallic sulphide.

23. In the purification of gas containing nitrogen oxide and oxygen from nitrogen oxide by contact with a porous, moist, metallic sulphide contact mass of high alkalinity, the step of supplying hydrogen sulphide or hydrogen sulphide containing gas in sufficient quantities to counteract the effect of a reaction between the oxygen and the metallic sulphide and to maintain sufficient metallic sulphide to remove substantially all of the nitrogen oxide by the action of said metallic sulphide.

24. In the purification of gas containing oxygen and nitrogen oxide from nitrogen oxide by contacting the gas with a moist porous contact mass comprising a mixture of a metal sulphide of the iron series of group VIII and from 30% to 70% alkali, the step of supplying sufficient hydrogen sulphide to counteract the effect of a reaction between the oxygen and the metal sulphide and maintaining the mixture in a sufficiently sulphided condition to cause the removal of substantially all of the nitrogen oxide by the action of the metal sulphide.

25. In the purification of gas containing oxygen and nitrogen oxide from nitrogen oxide by contacting the gas with a moist porous contact mass comprising mixture of iron sulphide and from 30% to 70% alkali, the step of supplying sufficient hydrogen sulphide to counteract the effect of a reaction between the oxygen and the iron sulphide and maintaining the mixture in a sufficiently sulphided condition to cause the removal of substantially all of the nitrogen oxide by the action of the iron sulphide.

26. In the purification of gas containing hydrogen sulphide, oxygen and nitrogen oxide from nitrogen oxide and hydrogen sulphide, the steps of purifying the bulk of the gas from hydrogen sulphide, thereafter contacting this portion of the gas with a moist porous contact mass of high alkalinity containing iron sulphide to remove the nitrogen oxide and admitting simultaneously to the contact mass the smaller portion of the gas which has not been purified of hydrogen sulphide to counteract the effect of a reaction between the oxygen and the iron sulphide and to maintain the sulphide content of the contact mass sufficiently high to remove substantially all of the nitrogen oxide by the action of said sulphide.

27. In gas purification, a method according to claim 6 in which the contacting of the gas with the porous mass takes place in the presence of hydrogen sulphide.

28. In gas purification, a method according to claim 6 in which the contacting of the gas with the porous mass takes place in the presence of an alkali and hydrogen sulphide.

29. In gas purification a method according to claim 6 in which the porous mass contains moisture and an alkali and the contact of the gas therewith takes place in the presence of hydrogen sulphide.

30. In gas purification a method of purifying gas from nitrogen oxide which comprises contacting the gas with a porous contact mass prepared by sulphiding a mixture containing "Lux" oxide and 30 to 70% alkali.

31. In the purification of gas from nitrogen oxide of which at least some is in the form of nitric oxide, the improvement which comprises systematically maintaining a sufficient metallic sulphide content in a porous mass containing a metal of the iron series of group VIII of the periodic table in sulphide condition to constitute the essential active ingredient for continuously removing substantially all of said nitric oxide, and utilizing said sulphide content for said nitric oxide removal by contacting the gas with said porous mass.

ALGER L. WARD.
CLAUDE W. JORDAN.